(12) United States Patent
Winklemann et al.

(10) Patent No.: US 7,059,456 B2
(45) Date of Patent: Jun. 13, 2006

(54) INTERNALLY-VENTILATED BRAKE DISKS WITH IMPROVED COOLING

(75) Inventors: Peter Winklemann, Thierhaupten (DE); Florian Zapf, Gersthofen (DE)

(73) Assignee: SGL Carbon AG (DE)

( * ) Notice: Subject to any disclaimer, the term of this patent is extended or adjusted under 35 U.S.C. 154(b) by 0 days.

(21) Appl. No.: 10/932,528

(22) Filed: Sep. 2, 2004

(65) Prior Publication Data

US 2005/0051393 A1   Mar. 10, 2005

(30) Foreign Application Priority Data

Sep. 9, 2003   (DE) ................ 103 41 464

(51) Int. Cl.
    F16D 65/847 (2006.01)
(52) U.S. Cl. .................. 188/264 AA; 188/218 XL
(58) Field of Classification Search ......... 188/218 XL, 188/264 A, 264 AA, 71.6, 18 A, 218 A, 58–59, 188/73.2; 301/6.3, 6.8; 192/113.23
    See application file for complete search history.

(56) References Cited

U.S. PATENT DOCUMENTS

| | | | |
|---|---|---|---|
| 1,717,522 A | | 6/1929 | Rosenberg |
| 2,345,016 A | | 3/1944 | Tack |
| 2,552,571 A | | 5/1951 | Mercier |
| 3,298,476 A | * | 1/1967 | Day ........................ 188/218 A |
| 4,128,363 A | | 12/1978 | Fujikake et al. |
| 4,164,993 A | * | 8/1979 | Kobelt ................. 188/218 XL |
| 5,427,212 A | | 6/1995 | Shimazu et al. |
| 5,526,905 A | * | 6/1996 | Shimazu et al. ...... 188/218 XL |
| 5,544,726 A | | 8/1996 | Topouzian et al. |
| 5,706,915 A | * | 1/1998 | Shimazu et al. ........... 188/71.6 |
| 5,810,123 A | | 9/1998 | Giorgetti et al. |
| 5,878,848 A | * | 3/1999 | Zhang .................. 188/218 XL |
| 6,142,257 A | | 11/2000 | Bruener et al. |
| 6,193,027 B1 | | 2/2001 | Krenkel et al. |
| 6,216,829 B1 | | 4/2001 | Daudi |
| 6,234,282 B1 | | 5/2001 | Martin |
| 6,257,376 B1 | | 7/2001 | Borgeaud et al. |
| 6,367,599 B1 | * | 4/2002 | Kobayashi ............ 188/218 XL |
| 6,386,341 B1 | | 5/2002 | Martin |
| 6,796,405 B1 | * | 9/2004 | Ruiz ......................... 188/71.6 |
| 2002/0017435 A1 | | 2/2002 | Feldmann et al. |
| 2004/0216969 A1 | * | 11/2004 | Prahst .................. 188/218 XL |

FOREIGN PATENT DOCUMENTS

| | | | |
|---|---|---|---|
| DE | 1 630 304 | | 6/1971 |
| DE | 22 57 176 | | 5/1974 |
| DE | 2 260 155 | | 6/1974 |
| DE | 4003732 A1 | * | 8/1991 |
| DE | 195 33 571 | | 4/1996 |
| DE | 44 45 226 | | 6/1996 |
| DE | 198 16 381 | | 10/1999 |
| DE | 199 25 003 | | 12/2000 |
| DE | 101 29 500 | | 11/2002 |
| DE | 10129500 A1 | * | 11/2002 |

(Continued)

Primary Examiner—Thomas Williams
(74) Attorney, Agent, or Firm—Connolly Bove Lodge & Hutz LLP

(57) ABSTRACT

Internally ventilated brake disk in the form of a circular ring disk with cooling channels in the interior of the disk which extend, respectively, from the inner circumference to the outer circumference of the circular ring disk, wherein the channel cross section and the channel course within the brake disk as well as the branching of the channels is designed such that the cooling effect by means of air flow is as efficient as possible.

6 Claims, 6 Drawing Sheets

FOREIGN PATENT DOCUMENTS

| | | |
|---|---|---|
| DE | 101 46 573 | 6/2003 |
| DE | 101 57 284 | 6/2003 |
| EP | 1515062 A1 * | 8/2004 |
| GB | 1096633 | 12/1967 |
| GB | 1403828 | 8/1975 |
| GB | 2 060 796 | 5/1981 |
| GB | 2144186 * | 2/1985 |
| WO | WO-97/26464 | 7/1997 |
| WO | WO 01/27490 A1 * | 4/2001 |
| WO | WO-03/012310 | 2/2003 |

* cited by examiner

INTERNALLY-VENTILATED BRAKE DISKS WITH IMPROVED COOLING

FIELD OF THE INVENTION

The invention relates to internally ventilated brake disks with improved cooling.

BACKGROUND OF THE INVENTION

Upon braking of motor vehicles, kinetic energy is converted into heat via the braking system, thereby reducing the speed of the motor vehicle.

The corresponding heat should be conducted from the point of its formation as efficiently as possible, since an increase in temperature of brake systems, today comprised mainly of a brake disk and brake caliper with brake pads, lead in most cases to a decrease of the friction coefficient.

With motor vehicles in which high kinetic energy must be converted into heat upon braking, brake disks with internal ventilation by means of channels in the interior of the disk are used. Such internally ventilated brake disks, for example, are know from the German laid-open document DE-A 22 57 176. In spite of these features, a substantial heating and an associated decrease of the coefficient of friction is still observed.

Improving the efficiency of the cooling of such channels in the interior of the brake disks is therefore needed.

SUMMARY OF THE INVENTION

This problem is solved by optimizing the geometry of the channels, whereby the channel cross section and the channel course within the brake disk is designed such that the cooling effect by means of air flow is as efficient as possible.

The present invention therefore relates to an internally ventilated brake disk in the form of a circular ring disk with cooling channels in the interior of the disk, which extend from the inner circumference to the outer circumference of the circular ring disk, whereby the ratio of the total surface Fa of the cross section, measured perpendicular to the center line of the channels, of the openings of channels lying on the outer circumference to the total surface Fi of the cross section, measured perpendicular to the center line of the channels, of the openings of the channels lying on the inner circumference amounts to Fa/Fi=0.1 to 1.07, preferably 0.3 to 1.03, and particularly preferably 0.5 to 1.01. It is especially preferred that the ratio Fa/Fi is less then 1.0.

The invention relates further to an internally ventilated brake disk in the form of a circular ring disk with cooling channels in the interior of the disk which extend from the internal circumference of the circular disk to its outer circumference, wherein the projections of the center lines of the channels onto the plane of the circular ring disk are curved and whose curvature radius amounts to at least 53%, preferably at least 55%, and particularly preferable, at least 60% of the outer radius of the circular ring disk. In a further preferred embodiment, the curvature radius of the projections of the center lines of the channels onto the plane of the circular ring disk increases from the inside to the outside, whereby the curvature radius on the inner ends of the channels amount to up to 45% of the outer radius of the circular ring disk, preferably up to 50%, and particularly preferably, up to 55% of the outer radius of the circular ring disk.

BRIEF DESCRIPTION OF THE DRAWINGS

Novel features and advantages of the present invention in addition to those noted above will be become apparent to persons of ordinary skill in the art from a reading of the following detailed description in conjunction with the accompanying drawings wherein similar reference characters refer to similar parts and in which.

DETAILED DESCRIPTION OF THE PREFERRED EMBODIMENTS

The present invention likewise relates to an internally ventilated brake disk in the form of a circular ring disk with cooling channels in the interior of the disk which extend from the inner circumference to the outer circumference of the circular disk, wherein the projections of the center lines of the channels onto the plane of the circular ring disk on the inner circumference of the circular ring disk stand at an angle of up to 25° to the radial direction. This angle preferably amounts to up to 23°, and particularly preferable is an angle of up to 20°.

The invention relates further to an internally ventilated brake disk in the form of a circular ring disk with cooling channels in the interior of the disk which extend from the inner circumference to the outer circumference of the circular ring, wherein the cooling channels are branched towards the outward circumference, such that a channel opening on the inner circumference is connected with at least two channel openings on the outer circumference and that a channel opening on the outer circumference is connected with at most one channel opening on the inner circumference. In this manner, the ratio of the number Na of the openings of the channels on the outer circumference to the number Ni of the openings of the channels lying on the inner circumference amounts to Na:Ni=2:1 to 5:1, preferably at least 2.5 to 1, and in particular, at least 3 to 1. In this regard, it is preferred that the center distance of the branching points lies at an interval of ri+(ra−ri)*x from the axis of rotation of the circular ring disk, whereby for the lower and upper limits of the interval, x assumes, respectively, values between 0.2 and 0.8, wherein of course, the value for the upper limit is greater than that for the lower limit. The limits of the interval are then limited by the lowest value for the lower limit, ri+(ra−ri)*0.2 and the highest value for the upper limit, ri+(ra−ri)*0.8. Herein, ri designates the inner radius and ra the outer radius of the circular ring disk. If Na/Ni is greater than 2, then it is preferred that the branching points lie in two, non-overlapping intervals ri+(ra−ri)*x, whereby x assumes a value of x1=0.1 to 0.5 for the first interval and for the second interval, x2=0.3 to 0.8, whereby the difference of the lowest value of x2 and the highest value of x1 amounts to at least 0.05, preferably 0.1. The values for the upper limit of the first interval and for the lower limit of the second interval are selected such that the difference mentioned is always maintained. If one, then, selects x1=0.1 to 0.5 as the limit for the first interval, for example, then x2=0.5 to 0.8; or if one selects the limits for the second interval x2=0.4 to 0.8, then the highest value for x1 can amount to 0.35 at the maximum.

Figure 1:
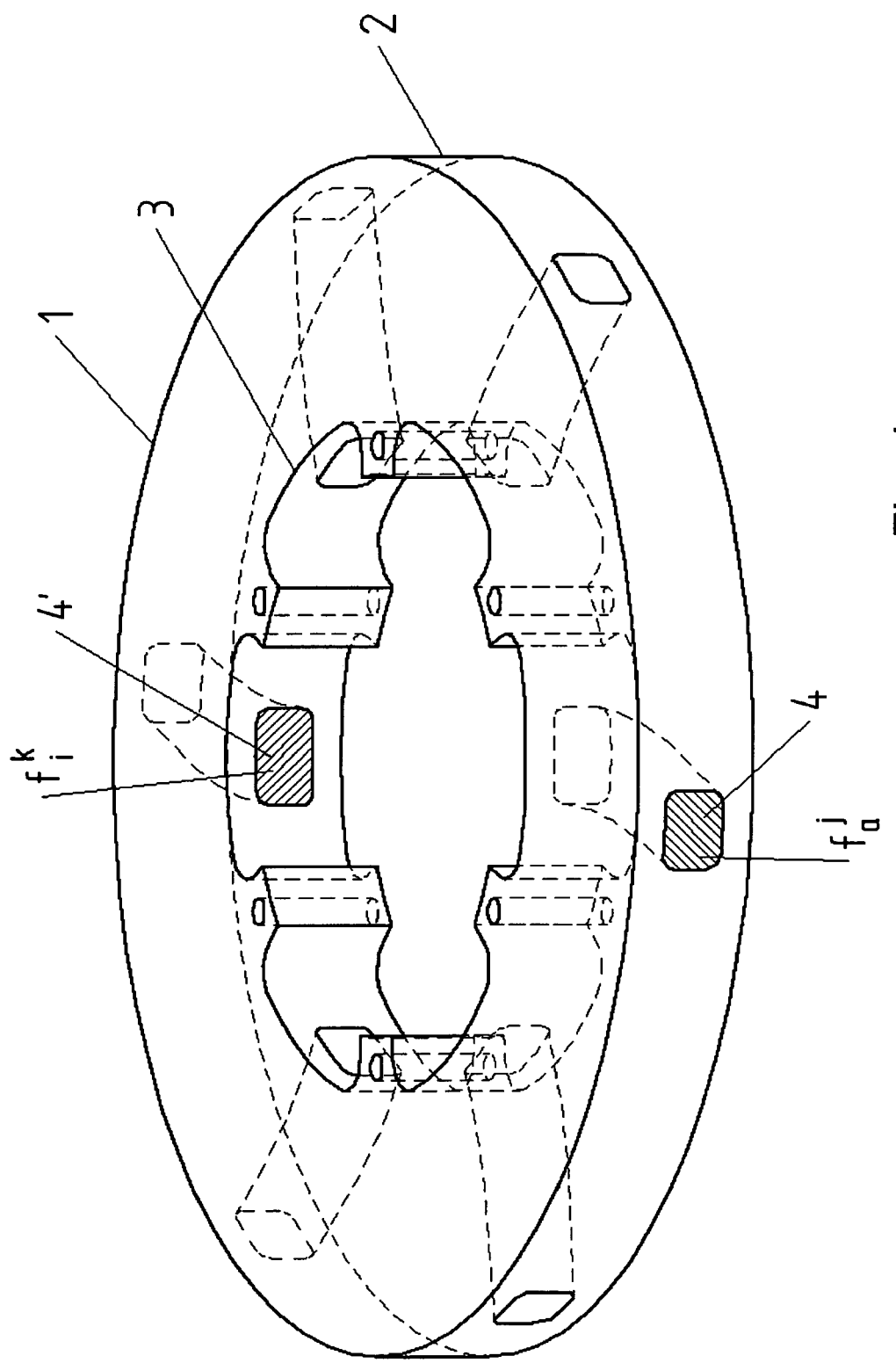
FIG. 1 is a perspective view of a brake disc, in accordance with the present invention.

FIG. 1 is a perspective view of a brake disk 1 in the form of a circular ring disk where cooling channels in the interior of the disk extend from the inner circumference 3 to the outer circumference 2. The channels are depicted by dotted lines, and one outer opening 4 and one inner opening 4' each of such an individual cooling channel being shown, with the outer surface of a cross section $f_a^j$ and the inner surface of an individual channel cross section $f_i^k$ being shown, each hatched in different directions.

The total surface Fa of the openings lying on the outer circumference is simply the sum of all surfaces of the individual outer openings $f_a^j$, as well as the total surface Fi of the openings lying on the outer circumference is simply the sum of all surfaces of the individual inner openings $f_i^k$. The ratio of Fa and Fi is discussed above.

Figure 2:
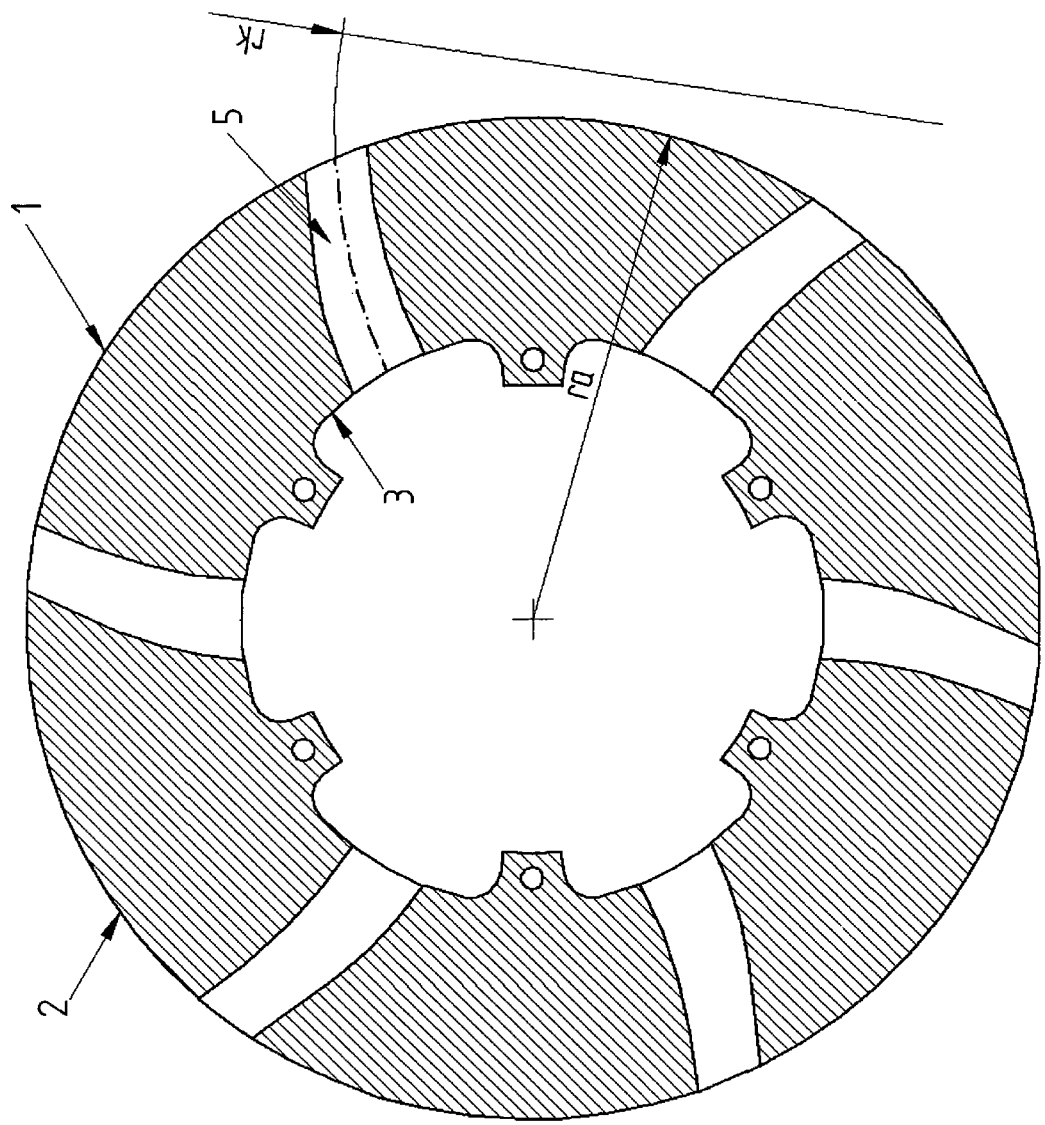
FIG. 2 is a cross sectional view parallel to the planes of the brake disc shown in FIG. 1.

FIG. 2 is a cross section parallel to the planes of a brake disk 1. In one of the channels 5, which are the light zones within the hatched circular ring zone, a projection of a center line is indicated. This center line is a curved line, with a radius of curvature rk being shown in the figure. The outer radius of the circular ring disk ra is also shown. The ratio of the radius of curvature rk to the outer radius ra is discussed above.

Figure 3:
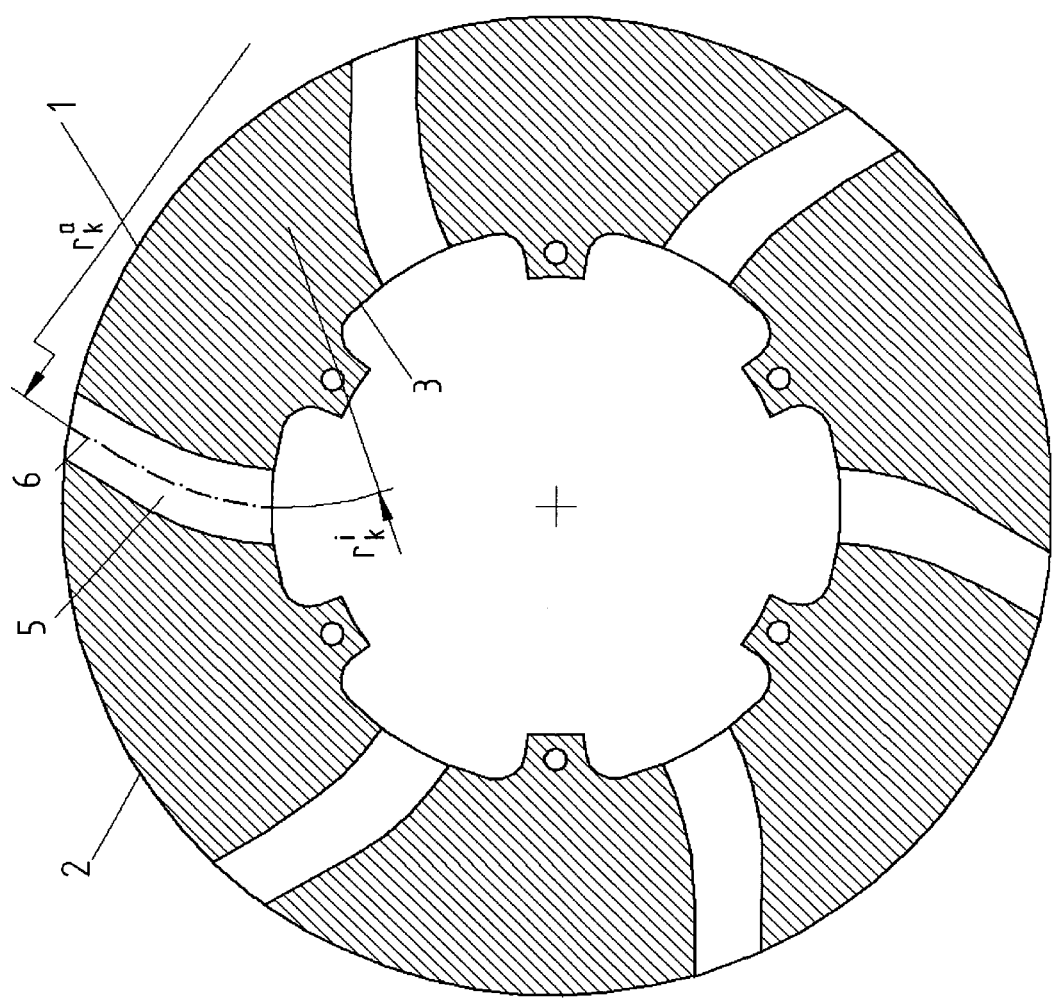
FIG. 3 is a cross sectional view similar to FIG. 2, but illustrating additional features of the present invention.

As a preferred embodiment, as shown in FIG. 3, the center line does not have a constant radius of curvature, rk, but as discussed above the radius of curvature increases from the inside $rk^i$ to the outside $rk^a$, whereby the radius $rk^i$ of curvature at the inner end (next to circumference 3) is stated as a percentage of the outer radius of the circular ring disk.

Figure 4:
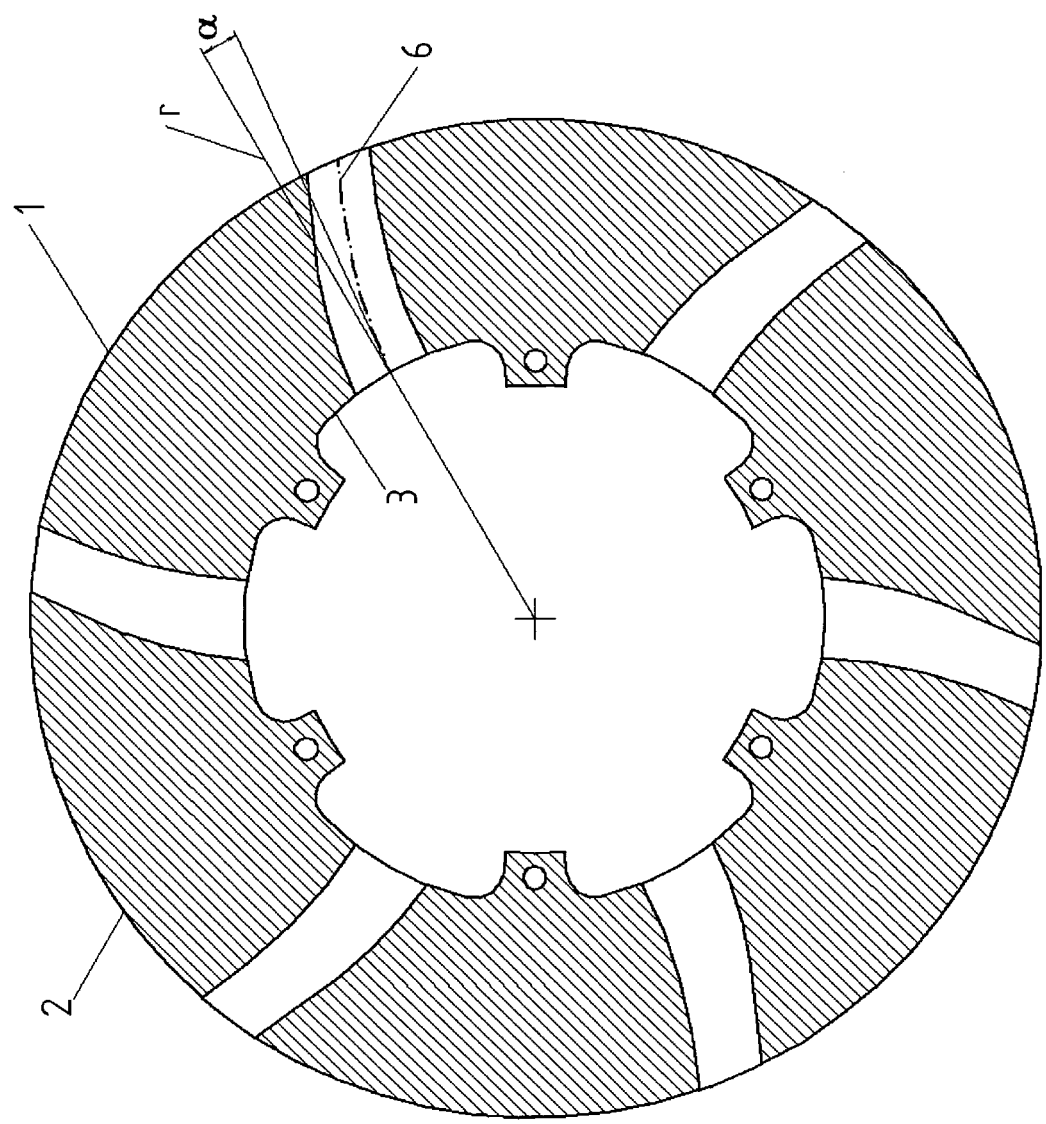
FIG. 4 is a cross sectional view similar to FIGS. 2 and 3, but illustrating additional features of the present invention.

The angle between the projection of the center line 6 at the inner circumference and the radial direction radius r is shown in FIG. 4.

Figure 5:
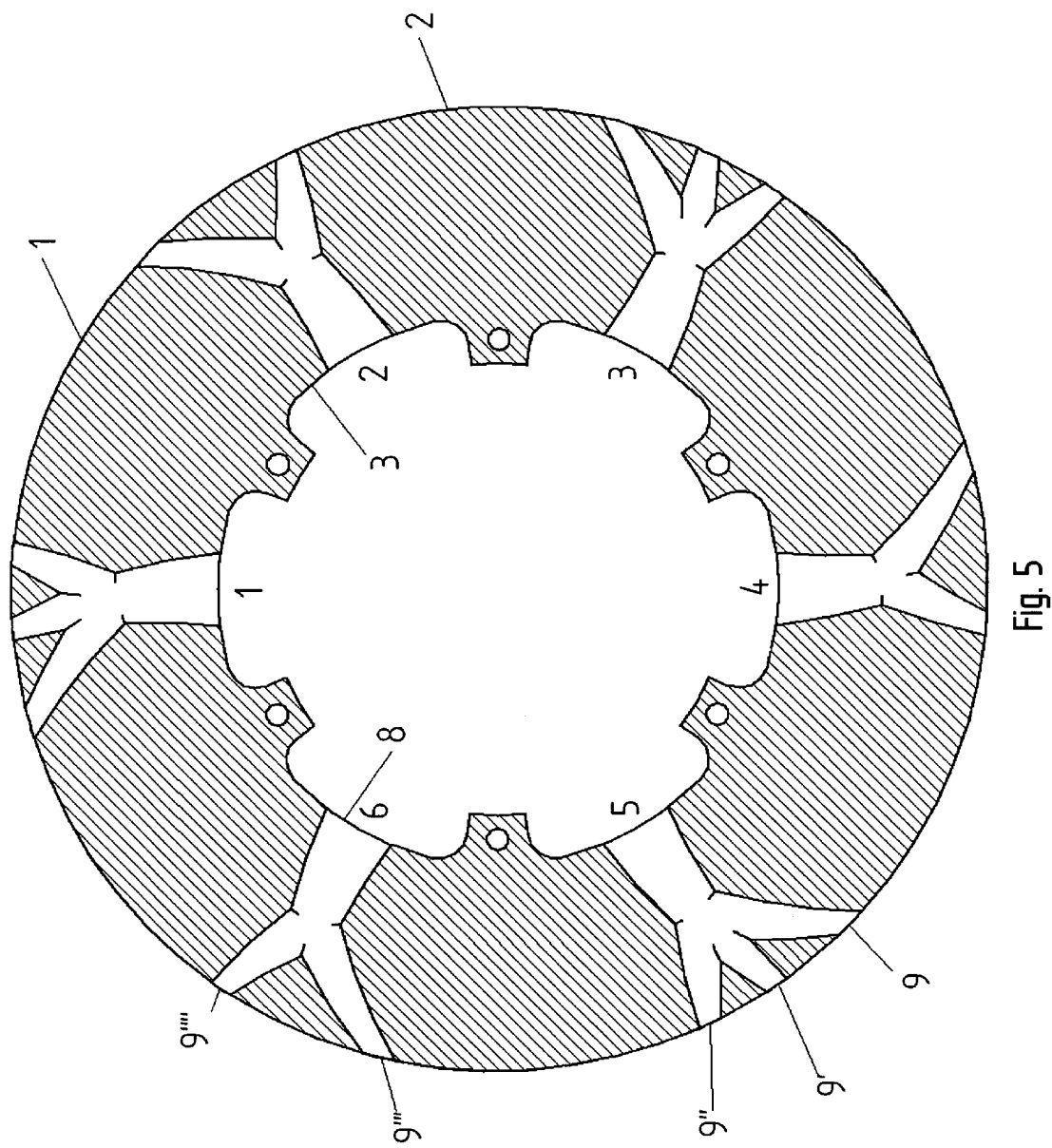
FIG. 5 is a cross sectional view parallel to the planes of a disc brake, but illustrating alternative branched cooling channels.

The embodiment where the cooling channels are branched is shown in FIG. 5. As an example, branching to two smaller channels and branching to three smaller channels are both shown in FIG. 5. The inner openings at the inner circumference 3 are denoted by numbers from 1 to 6. There are 15 outer openings at the outer circumference 2 to be counted in this example, as shown in FIG. 5. They are connected in a way that a channel opening 8 at the inner circumference 3 is connected to at least two channel openings 9''' and 9'''' at the outer circumference 2 as discussed above.

Also seen from FIG. 5 is that the number Na (in this special case 15) of openings of channels at the outer circumference 2 exceeds the number of openings Ni (in this special case 6) at the inner circumference 3. The ratio of Na to Ni in this special case is 15/6, or 2.5:1, which is between 2:1 and 5:1.

Figure 6:
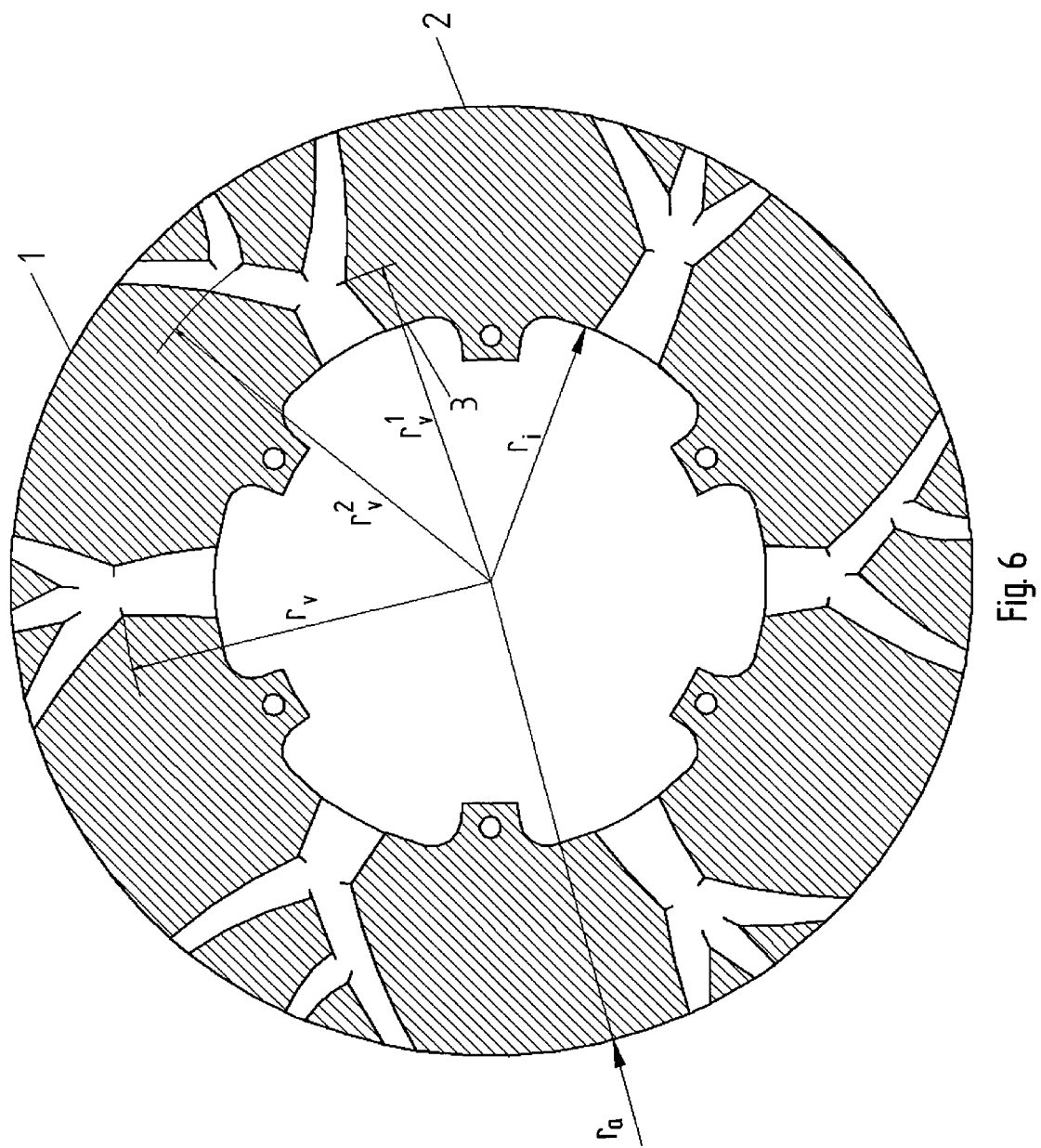
FIG. 6 is a cross sectional view similar to FIG. 5, but illustrating modified branched cooling channels.

The relationship between the radii ri, the radius belonging to the inner circumference of the rinf disk, ra, the radius belonging to the outer circumference of the ring disk, and the radii of the branching points, where only three such radii $r_v$, $r_v^1$ and $r_v^2$ are shown for simplicity in FIG. 6.

Channels are only in the ring zone between ri and ra. Different kinds of branching from one channel at the inside to two channels at the outside are shown for comparison.

In the case where branching is at the same point (those branches corresponding to the hours of 12, 4, and 8) the radius of the branching point (=the center distance of the branching point, $r_v$) must simply be between ri and ra. As noted above, it is stated that preferably, the branching point is from 20% to 80% of the radial width if the ring disk.

In the interesting case of branching at different points, FIG. 6 shows that the branching points have different radii, $r_v^1$ and $r_v^2$ which lie in non-overlapping sections. As explained above $r_v^1$ stands for a value in the interval ri+(ra−ri)×x1, and $r_v^2$ stands for a value in ri+(ra−ri)×x2., with x1 and x2 being from 0.1 to 0.5, and 0.3 to 0.8, respectively, and x1 and x2 being chosen in a way that the difference between the lowest value of x2 and the highest value of x1 in a given circular ring disk, is at least 0.05.

In the frame of the present invention, of course it is possible to combine the noted features. By combining two or more than two of these features, the efficiency of the cooling is further increased.

It is particular advantageous to use the noted features with brake disks made from fiber-reinforced ceramic material, in particular, such materials in which reinforcing fibers are made from carbon, and in particular, with such fiber-reinforced ceramic materials whose matrix phases contain silicon carbide. Particularly advantageous, therefore, are internally ventilated brake disks in the form of a circular ring disk with interior cooling channels which comprise a carbon fiber reinforced ceramic material which contains silicon carbide in the matrix, whereby the cooling channels have at least one of the features of the present invention.

In the embodiments according to the present invention, through the improved air flow in the channels, a significant lowering of the operating temperature of the brake disk during continuous braking and a rapid lowering of the temperature of the rotating brake disk after braking is provided.

The invention claimed is:

1. An internally ventilated brake disk in the form of a circular ring disk with cooling channels in the interior of the disk which extend, respectively, from the inner circumference to the outer circumference of the circular ring disk, characterized in that the cooling channels are branched from the inside to the outside such that one channel opening on the inner circumference is connected with at least two channel openings on the outer circumference, and that one channel opening on the outer circumference is connected with at most one channel opening on the inner circumference, wherein the number of the branching points is 2 or greater than 2, and that the distances from the center of the disk to the branching points lie in two non-overlapping intervals ri+(ra−ri)*x, wherein x assumes a value of x1=0.1 to 0.5 for the first interval and x2=0.3 to 0.8 for the second interval, wherein the difference between x2 and x1 amounts to at least 0.05, and the ratio of the total surface Fa of the cross section, measured perpendicular to the center line of the channels, of the openings of channels lying on the outer circumference to the total surface Fi of the cross section, measured perpendicular to the center line of the channels, of the openings of the channels lying on the inner circumference amounts to Fa/Fi=0.1 to 1.07.

2. The internally ventilated brake disk of claim 1 characterized in that the projections of the center lines of the cooling channels onto the plane of the circular ring disk are curved, and wherein the bending radius amounts to at least 53% of the outer radius of the circular ring disk.

3. The internally ventilated brake disk according to claim 2, characterised in that the curvature radius of the projections of the center lines of the channels onto the plane of the circular ring disk increase from the inside towards the outside, wherein the curvature radius on the inner ends of the channels amount to up to 45% of the outer radius of the circular ring disk.

4. The internally ventilated brake disk of claim 1, characterised in that the projections of the center lines of the channels onto the plane of the circular ring disk on the inner circumference of the circular ring disk stand at an angle of up to 25° to the radial direction.

5. The internally ventilated brake disk of claim 1 wherein the ratio of the number Na of the openings of the channels lying on the outer circumference to the number Ni of the openings of the channels lying on the inner circumference is Na:Ni=3:1 to 5:1.

6. The internally ventilated brake disk according to claim 1, characterised in that the difference between $x_2$ and $x_1$ amounts to at least 0.1.

* * * * *